United States Patent [19]
Rosinski et al.
[11] Patent Number: 4,521,298
[45] Date of Patent: * Jun. 4, 1985

[54] PROMOTION OF CRACKING CATALYST OCTANE YIELD PERFORMANCE

[75] Inventors: Edward J. Rosinski, Pedricktown, N.J.; Albert B. Schwartz, Philadelphia, Pa.

[73] Assignee: Mobil Oil Corporation, New York, N.Y.

[ * ] Notice: The portion of the term of this patent subsequent to Jan. 5, 1999 has been disclaimed.

[21] Appl. No.: 331,428

[22] Filed: Dec. 16, 1981

Related U.S. Application Data

[63] Continuation-in-part of Ser. No. 170,220, Jul. 18, 1980, Pat. No. 4,309,280.

[51] Int. Cl.[3] .......... C10G 11/02
[52] U.S. Cl. .......... 208/120; 208/111
[58] Field of Search .......... 208/120, 113

[56] References Cited

U.S. PATENT DOCUMENTS

| | | | |
|---|---|---|---|
| 3,649,521 | 3/1972 | Martin | 208/120 |
| 3,649,522 | 3/1972 | Martin | 208/74 X |
| 3,758,403 | 9/1973 | Rosinski et al. | 208/120 |
| 3,894,393 | 7/1975 | Owen et al. | 208/77 |
| 3,894,394 | 7/1975 | Owen et al. | 208/77 |
| 3,894,931 | 7/1975 | Nace et al. | 208/73 |
| 3,941,871 | 3/1976 | Dwyer et al. | 423/326 |
| 4,287,048 | 9/1981 | Gladrow et al. | 208/120 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,368,114 | 1/1983 | Chester et al. | 208/120 |

OTHER PUBLICATIONS

Shankland & Schmitkons, "Determination of Activity and Selectivity of Cracking Catalyst", Proc. API 27 (III), 1947, pp. 57-77.

*Primary Examiner*—Curtis R. Davis
*Attorney, Agent, or Firm*—A. J. McKillop; M. G. Gilman; M. V. Schneller

[57] ABSTRACT

A process for increasing gasoline octane number and/or total gasoline yield in catalytic cracking units by the addition of a very small amount of finely divided shape selective additive promoter, which additive promoter is not intimately combined with a substantial amount of another solid prior to contact with the cracking catalyst. The additive promoter is a zeolite characterized by a silica to alumina mole ratio greater than about 500 and a constraint index within the approximate range of 1 to 12.

20 Claims, No Drawings

PROMOTION OF CRACKING CATALYST OCTANE YIELD PERFORMANCE

This is a continuation-in-part of Ser. No. 170,220, filed July 18, 1980, now U.S. Pat. No. 4,309,280.

BACKGROUND OF THE INVENTION

1. Field of the Invention

This invention relates to an improved technique for increasing gasoline octane number and total yield while enhancing operational flexibility in catalytic cracking units by the addition of very small amounts of finely divided shape selective additive promoter to cracking catalysts.

2. Description of the Prior Art

Conversion processes utilizing crystalline zeolites have been the subject of extensive investigation during recent years, as is obvious from both the patent and scientific literature. Crystalline zeolites have been found to be particularly effective for a wide variety of organic compound conversion processes including the catalytic cracking of a gas oil to produce motor fuels. Such processes have been described and claimed in many patents, including U.S. Pat. Nos. 3,140,249; 3,140,251; 3,140,252; 3,140,253; and 3,271,418. It is further known from the prior art to incorporate the crystalline zeolite into a matrix for catalytic cracking and such disclosure appears in one or more of the above-identified patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a larger pore size crystalline zeolite (pore size greater than 8 Angstrom units) has indeed been very effective with respect to the raising of octane number, nevertheless it did so at the expense of the overall yield of gasoline.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and including about 5 to 10 weight percent; the latter patent discloses the weight ratio of ZSM-5 type zeolite to large pore size crystalline zeolite in the range of 1:10 to 3:1.

The criticality of using only very small amounts of a finely divided ZSM-5 class zeolite to achieve improved results with respect to octane number and overall yield has heretofore not been recognized in the art. It is the basis of the present invention that the use of only very small quantities of finely divided shape selective additive will give the same beneficial results that were once thought obtainable only by adding much larger quantities of catalyst comprising a zeolite of the ZSM-5 type preferably contained in a porous matrix.

In order to reduce automobile exhaust emissions to meet federal and state pollution requirements, many automobile manufacturers have equipped the exhaust systems of their vehicles with catalytic converters. Said converters contain catalysts which are poisoned by tetraethyl lead. Since tetraethyl lead has been widely used to boost the octane number of gasoline, refiners now have to turn to alternate means to improve gasoline octane number.

Many methods of octane improvement, however, substantially reduce the yield of gasoline. With the present short supply of available crude oil and the concomitant high demand for unleaded gasoline with a sufficiently high octane number, refiners are faced with a severe dilemma. Unfortunately, these trends are likely to continue in the foreseeable future.

One method of incresing octane number is to raise the cracking reaction temperature. This method, however, is very limited, since many units are now operating at maximum temperatures due to metallurgical limitations. Raising the cracker reactor temperature also results in increased requirements for the gas plant (i.e. gas compressor and separator). Since most gas plants are now operating at maximum capacity, any increased load could not be tolerated by the present equipment.

As can well be appreciated from the foregoing, it would be extremely desirable to have a process which will provide high octane unleaded gasoline without undue sacrifice of gasoline yield. It would be even more desirable if such results could be obtained in a simplified manner allowing an increase in operational flexibility without undue use of expensive catalysts.

CROSS REFERENCE TO RELATED APPLICATION

The subject matter of this application is related to that of copending application Ser. No. 100,585 filed Dec. 5, 1979, now U.S. Pat. No. 4,309,279.

SUMMARY OF THE INVENTION

In accordance with the present invention, there has now been discovered an improved process to upgrade the octane number and/or total yield in catalytic cracking units. By the addition of a very small amount of finely divided additive promoter to cracking catalysts, there is provided a significant improvement in the octane number of the resultant gasoline, while increasing the total yield comprised of $C_5+$ gasoline and alkylate.

Whereas it was previously believed that up to about 10 weight percent additive zeolite, preferably contained in a matrix, was required to boost octane number, it has now been discovered that only a very small amount of finely divided additive zeolite not intimately combined with substantial amount of another solid will bring forth similar beneficial results. The totally unexpected discovery of this invention will be of great significance in the field of petroleum refining.

The improved process of this invention affords the refiner greater flexibility in catalytic cracking operation, since only a very small quantity of additive zeolite can quickly boost the octane number of the product. The need for only very small quantities of said additive zeolite further affords the use of techniques such as surface coating of the cracking catalyst particles with the zeolite additive promoter or dispersion of the latter in the catalytic cracking chargestock prior to contact with the cracking catalyst.

The use of the zeolite additive promoter directly, i.e. without prior combination with or incorporation in a matrix, in powder form and in small amount further provides a simplified method lending itself to flexibility and in savings in zeolite usage affording a more efficient and economic overall refinery operation.

The shape selective additive utilized in the present process comprises a class of tectosilicates which are characterized by a silica to alumina mole ratio of at least 12 and a constraint index, as hereinafter described, of about 1 to 12. The aforenoted silica to alumina mole ratio may, at least theoretically extend up to infinity, i.e. the additive zeolite can contain essentially no alumina. The additive zeolite can be introduced without prior incorporation in a matrix to the cracking process in the form of finely divided powder having a particle size of less than about 5 microns. Generally, it is contemplated that the finely divided zeolite additive promoter will be added to the cracking catalyst as a dry powder which serves to at least partially surface coat the catalyst particles or as a dispersion in the catalytic cracking chargestock. It will be understood, however, that the shape selective additive promoter may be added in any manner and at any of a variety of points to the catalyst inventory defined as total catalyst in the operating unit, including reactor, regenerator, transfer lines, stripping zones, etc. The additive promoter may also be added in the form of an aqueous slurry or as a suspension in an organic medium, other than the cracking chargestock. The additive promoter can also be introduced to and/or recycled through the recycle feed. The process described herein is applicable to any and all types of cracking units including FCC (Fluid Catalytic Cacking) utilizing very finely divided particles of cracking catalyst and TCC (Thermofor Catalytic Cracking) utilzing a moving bed type reactor. The weight ratio of the additive zeolite promoter to the amount of cracking catalyst ranges from between about 1:10,000 and about 1:100 and preferably from abut 1:5000 to about 1:300.

DESCRIPTION OF THE PREFERRED EMBODIMENTS

Addition of a promoter comprising one or more members of a class of zeolites, as defined hereinafter, is extremely effective as an octane and total yield improver in very small amounts when used in conjunction with a cracking catalyst. It has been found that only about 0.01 to 1.0 wt. % of this class of zeolites added to the cracking catalyst in the unit under conventional cracking operations can increase octane by about 1 to 5 RON+0 (research octane number without lead). If excess alkylation capacity is available, $C_5+$ gasoline plus alkylate yields are higher when the additive zeolite is utilized as compared to conventional commercial cracking catalysts, without sacrificing the octane increase.

Since the additive zeolites are very active catalytically in the fresh state, only very small quantities are necessary to obtain substantial octane improvement in a commercial cracking unit. Thus, the refiner is afforded great flexibility in commercial cracking operation, since the additive zeolite can be quickly introduced as a finely divided dry powder of less than 5 micron particle size to the cracking catalyst. In such instance, the added zeolite promoter provides an at least partial surface coating on the cracking catalyst particles. Alternatively, the powdered zeolite additive may be conveniently dispersed in the catalytic cracking chargestock prior to contacting the latter with the cracking catalyst in the unit. The refiner can efficiently control the magnitude of octane increase by controlling the rate of addition of zeolite additive promoter. Such flexibility is highly desirable in situations where feed composition or rate ranges occur, when demand for high octane gasoline (unleaded) fluctuates, or when capacity for alkylation varies due to mechanical problems or changes in overall refinery operation.

Thus, the present process provides means for controlling octane gain to the extent desired by the introduction of only very small amounts of finely divided additive zeolite. In commercial practice, the octane gain can be maximized or controlled to operate at maximum light gas handling capability or full alkylation capacity.

The particular proportion of the additive zeolite introduced to the cracking catalyst is important since only a very small amount of finely divided additive zeolite is required to produce substantial octane gain. The weight percent of the zeolite additive promoter required in relation to the total quantity of cracking catalyst in the unit can range between about 0.01 and about 1.0 and preferably from between about 0.02 and about 0.5. The exact weight percent will vary from cracking unit to cracking unit depending on the desired octane number, total gasoline yield required, the available feedstock and the activity of the cracking catalyst.

The additive zeolite promoter may feasibly be added as a dry powder of less than 5 micron particle size to the cracking catalyst particles in an amount sufficient to provide at least a partial surface coating on said particles, which coated particles are thereafter brought into contact with the catalytic cracking chargestock. Alternatively, the powdered zeolite additive promoter may be dispersed in the chargestock prior to contacting the latter with the cracking catalyst contained in the cracking unit.

In one preferred embodiment, the zeolite additive promoter, in powdered form, is initially introduced as a slurry in a quantity of the chargestock, which slurry is contained in a feed vessel, from which it is subsequently displaced with the chargestock, free of dispersed zeolite promoter, into the reactor of the cracking unit where it comes into contact with the cracking catalyst under conventional catalytic cracking conditions. Another preferred aspect of the described slurry technique is the ability to pre-react the chargestock in the presence of the zeolite additive promoter prior to introduction of the same into the cracking unit. Such is achieved by controlling conditions of temperature, pressure, and duration of contact between chargestock and zeolite additive promoter. It is contemplated that the use of additive gases, such as hydrogen, may further be effective during prereaction of the chargestock and zeolite additive promoter. It is also contemplated that catalytic demetalation of a high metals content chargestock could be achieved during the prereaction period. Once the additive zeolite is introduced to the cracking process, the refiner can return to conventional operation or an operation at lower octane number by eliminating or decreasing the use of additive zeolite. Thus, the increase in octane number over the number obtainable under conventional cracking operations can be readily and easily controlled by adjusting the amount of additive zeolite promoter.

Catalytic cracking units which are amenable to the process of this invention operate within the temperature range of about 400° F. to 1300° F. and under reduced atmospheric or superatmospheric pressure. The catalytic cracking process may be operated batchwise or continuously. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

A recent advance in the art of catalytic cracking is disclosed in U.S. Pat. No. 4,072,600, the entire contents of which are incorporated herein by reference. One embodiment of this patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the conventional cracking catalyst can vary from between about 0.1 ppm and about 100 ppm based on total catalyst inventory. The aforesaid metals can also be introduced into the process with or as part of the additive zeolite in amounts such that the overall content of such metal based on total catalyst in the cracking unit is within the aforenoted range.

After cracking, the resulting product gas is compressed and the resulting products may suitably be separated from the remaining components by conventional means such as adsorption, distillation, etc.

Hydrocarbon charge stocks undergoing cracking in accordance with this invention comprise hydrocarbons generally and, in particular, petroleum fractions having an initial boiling point of at least 400° F., a 50% point of at least 500° F. and an end point of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The additive porous tectosilicate (porotectosilicate) functioning as octane number promoter in the process of this invention is characterized by a pore dimension greater than about 5 Angstroms, i.e., it is capable of sorbing paraffins having a single methyl branch as well as normal paraffins, and it has a silica to alumina mole ratio of at least 12, which may extend up to very high levels and, in fact, the additive porotectosilicate may be essentially free of alumina. Zeolite A, for example, with a silica to alumina ratio of 2.0, is not useful in this invention, and moreover it has no pore dimension greater than about 5 Angstroms.

The porotectosilicates utilized as additive promoters herein constitute an unusual class of natural and synthetic materials. They are characterized by having a rigid crystalline framework structure composed generally of an assembly of atoms other than those of oxygen, each surrounded by a tetrahedron of shared oxygen atoms, and a precisely defined pore structure. The crystalline porous tectosilicate additive in the ZSM-5 family, i.e. ZSM-5 or ZSM-11, has a characteristic X-ray diffraction pattern, the four strongest lines of which are set forth in Table 1 below.

Table 1

| Interplanar Spacing d (A) |
|---|
| 11.1±0.3 |
| 10.0±0.2 |
| 3.85±0.07 |
| 3.71±0.5 |

These values were determined by standard techniques. The radiation was the K-alpha doublet of copper, and a scintillation counter spectrometer with a strip chart pen recorder was used. The peak heights, I, and the positions as a function of 2 times theta, where theta as the Bragg angle were read from the spectrometer chart. From these, the relative intensities, 100 I/Io where Io is the intensity of the strongest line or peak and d(obs.), the interplanar spacing in A, corresponding to the recorded lines, were calculated.

Exchangeable cations, if present may be replaced. The additive promoter employed may constitute substantially pure crystalline silica, i.e., devoid of any added source of alumina, such as, for example, materials described in U.S. Pat. No. 3,941,871 and in *Nature,* Vol. 271 page 512, Feb. 9, 1978. In general, suitable shape selective additive promoters, applicable for use herein comprise crystals in which atoms constituting at least those of silicon or germanium are tetrahedrally coordinated to oxygen atoms to provide a structure of definite configuration having an X-ray diffraction pattern substantially as shown in Table 1. Such additive promoters include by way of example, aluminosilicates, gallosilicates, ferrosilicates, borosilicates, chromosilicates, aluminogermanates, phosphosilicates, and galloaluminosilicates. Usually, the additive promoter will be an aluminosilicate, although it is contemplated that aluminum may be replaced in part or in entirety by gallium, iron, boron, phosphorus, chromium or mixtures thereof or even eliminated entirely. Silicon may be replaced, in part or in entirety by germanium.

The preferred additive porotectosilicates referred to herein constitute a class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributed to cations associated with framework aluminum atoms. These zeolites retain their crystallinity for long periods in spite of the presence of steam even at high temperatures. In many environments, the additive zeolites utilized herein exhibit very low coke forming capability, conducive to very long times on stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of tetrahedra linked together by oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful in the process of this invention possess, in combination: a Constraint Index, as hereinafter defined, of about 1 to 12, a silica to alumina mole ratio of at least about 12, and a structure providing constrained access to the intracrystalline free space.

The silica to alumina mole ratio referred to may be determined by conventional analysis. This ratio is meant to represent, as closely as possible, the ratio in the rigid framework of the zeolite crystal and to exclude aluminum in cationic or other form within the channels. Although additive porotectosilicates with a silica to alumina mole ratio of at least 12 are useful, it is preferred to use zeolites having higher ratios of at least about 30. In some zeolites, the upper limit of silica to alumina mole ratio is unbounded, with values of 30,000 and greater, extending at least theoretically up to infinity. Such zeolites, after activation, acquire an intacrystalline sorption capacity for normal hexane which is greater than that for water, i.e., they exhibit "hydrophobic" properties.

The porotectosilicates comprising the additive zeolites utilized in the process of this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only windows in a crystal are formed by 8-membered rings of oxygen atoms, then access by molecules of larger cross-section than normal hexane is substantially excluded and the zeolite is not of the desired type. Additive zeolites with windows of 10-member rings are preferred, although excessive puckering or pore blockage may render these zeolites substantially ineffective. Additive zeolites with windows of 12-membered rings do not generally appear to offer sufficient constraint to produce the advantageous octane number improvement desired in the instant invention, although structures can be conceived, due to pore blockage or other cause, that may be operative.

Rather than attempt to judge from crystal structure whether or not a zeolite possesses the necessary constraint access, a simple determination of the "Constraint Index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10} \text{(fraction of n-hexane remaining)}}{\log_{10} \text{(fraction of 3-methylpentane remaining)}}$$

The constraint index approximates the ratio of the cracking rate constants for the two hydrocarbons. Zeolites suitable for the present invention are those which employ a zeolite having a constraint index from 1.0 to 12.0. Constraint Index (C.I.) values for some typical zeolites, including some not within the scope of this invention, are:

| Zeolite | C.I. |
|---|---|
| Erionite | 38 |
| ZSM-5 | 8.3 |
| ZSM-11 | 8.7 |
| ZSM-35 | 6.0 |
| TMA Offretite | 3.7 |
| ZSM-38 | 2.0 |
| ZSM-12 | 2 |
| Beta | 0.6 |
| ZSM-4 | 0.5 |
| Acid Mordenite | 0.5 |
| REY | 0.4 |
| Amorphous Silica-Alumina | 0.6 |
| ZSM-23 | 9.1 |

The above-described Constraint Index is an important and even critical definition of those zeolite additives which are useful in the instant invention. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above-defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a constraint index of 1 to 12 is intended to be included in the instant additive zeolite definition regardless that the same identical zeolite tested under other defined conditions may give a constraint index value outside of 1 to 12.

The additive zeolites utilized herein are exemplified by ZSM-5, ZSM-11, ZSM-12, ZSM-23, ZSM-35, ZSM-38 and other similar materials. U.S. Pat. No. 3,702,886 describing and claiming ZSM-5 is incorporated herein by reference. Also, U.S. Pat. No. Re. No. 29,948 describing and claiming a crystalline material with an X-ray diffraction pattern of ZSM-5, is incorporated herein by reference as is U.S. Pat. No. 4,061,724 describing a high silica ZSM-5 referred in such patent as "silicalite".

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

Natural zeolites may sometimes be converted to this class of zeolites by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred zeolites of the additive catalyst are ZSM-5, ZSM-11, ZSM-12, ZSM-23, ZSM-35 and ZSM-38, with ZSM-5 particularly preferred.

The zeolites used as additive catalysts in this invention may be in the as synthesized form, sodium form, ammonium form, hydrogen form or they may be base exchanged or impregnated to contain other elements such as rare earth cation complement. Such rare earth cations comprise Sm, Nd, Pr, Ce and La. It is desirable to calcine the zeolite after base exchange. In some cases it may be desirable to further modify the additive by thermal or steam treatment.

In a preferred aspect of this invention, the additive zeolites are selected as those having a crystal framework density, in the dry hydrogen form, of not substantially below about 1.6 grams per cubic centimeter. It has been found that zeolites which satisfy all three of these criteria are most desired. Therefore, the preferred additive zeolites utilized in the process of this invention are those comprising a zeolite having a constraint index as defined above of about 1 to 12, a silica to alumina mole ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper is included in Proceedings of the Conference on Molecular Sieves, London, April 1967, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The additive zeolites utilized in the process of this invention may be prepared in various ways. The particle size of the individual component zeolite particles when utilized should be less than 5 microns. Such particle size may be obtained in the as synthesized form or by grinding larger size particles to the requisite particle size of less than 5 microns.

While in the case of many catalysts, it is desirable to incorporate the zeolite component of the catalyst in a matrix, the additive zeolite promoter utilized in the present process is employed without prior combination with a matrix. Thus, the additive zeolite promoter utilized with a matrix. Thus, the additive zeolite promoter utilized is in substantially pure form, i.e. not imtimately combined with any substantial amount of other solid prior to contact with the conventional cracking catalyst.

Conventional cracking catalysts heretofore used contain active components which may be amorphous or crystalline. However, the major conventional cracking catalysts presently in use generally comprise a crystalline zeolite (active component) in a suitable matrix. Representative crystalline zeolite active component constitutents of said cracking catalysts include zeolite X (U.S. Pat. No. 2,882,244), zeolite Y (U.S. Pat. No. 3,130,007), synthetic mordenite and dealuminized synthetic mordenite, merely to name a few, as well as naturally occurring zeolites, including chabazite, faujasite, mordenite, and the like. Preferred crystalline zeolites include natural faujasite and the synthetic faujasite zeolites X and Y, with particular preference being accorded zeolite Y.

The cystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures theeof, witb particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable inorganic oxide, generally a sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Where a matrix is used, content of crystalline zeolite, i.e. the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

The following examples will serve to illustrate the process of the invention without limiting the same:

EXAMPLE 1

FS30, a commercially available FCC catalyst manufactured by Filtrol Corporation consisting of 16–17 weight percent RENaY in a clay-gel matrix, was steamed for 4 hours at 1400° F., 0 psig with 100% steam in a fluidized bed to simulate the deactivation of cracking catalysts occurring in commercial operation.

EXAMPLE 2

A sample of Na ZSM-5 having a crystallite size of 0.02–0.05 micron was precalcined in nitrogen for 3 hours, then contacted for 2 hours with 10 weight percent aqueous $NH_4Cl$ solution at 200° F. using 10 cc of solution per gram of the zeolite. Such contact resulted in ion exchange with formation of $NH_4$ ZSM-5. Following the exchange, the zeolite product was water washed essentially free of chloride ion and dried at 230° F. The dried $NH_4$ ZSM-5 so obtained was ground to a finely divided particle size of less than 5 microns. The steamed FS30 catalyst of Example 1 in an amount of 135 grams was coated with 200 ppm of the resulting $NH_4$ ZSM-5 powder.

EXAMPLE 3

Catalytic cracking of a gas oil was carried out utilizing the catalyst of Example 1. The charge stock employed was Joliet Sour Heavy Gas oil having the following properties:

| Chargestock Properties | |
|---|---|
| Properties | Joliet Sour Heavy Gas Oil |
| Gravity, °API | 24.3 |
| Sulfur, % Wt | 1.87 |
| Nitrogen, % Wt | 0.03 |
| Basic Nitrogen, PPM | 327 |
| CCR, % Wt | 0.29 |
| Aniline Point, °F. | 171 |
| KV - 210° F., cs | 3.62 |
| Bromine No. | 4.2 |
| Hydrogen, % Wt | 12.3 |
| Refractive Index - 70° C. | 1,50801 |
| Molecular Weight | 358 |
| Distillation, °F. (D-1160) | |
| IBP | 414 |
| 5% vol | 548 |
| 10 vol | 614 |
| 20 vol | 667 |
| 30 vol | 701 |
| 40 vol | 733 |
| 50 vol | 767 |
| 60 vol | 801 |
| 70 vol | 839 |
| 80 vol | 877 |
| 90 vol | 924 |
| 95 vol | 956 |
| Composition, % Wt | |
| Paraffins % Wt | 23.5 |
| Naphthenes, % Wt | 32.0 |
| Aromatics, % Wt | 44.5 |
| $C_4$, (ndm) | 18.9 |

Cracking was conducted in a fixed-fluidized bed bench unit at 960° F., utilizing a weight hourly space velocity of about 12.5 and a catalyst/oil ratio of 2.

EXAMPLE 4

Using the promoted catalyst of Example 2, cracking was carried out with the same gas oil charge stock and under process conditions identical with those used in Example 3. Comparative catalytic cracking data obtained using the catalysts of Examples 1 and 2 are set forth in the following table:

TABLE I

| | Catalyst of Ex. 1 | Catalyst of Ex. 2 | |
|---|---|---|---|
| Conversion, Vol. % | 74.9 | 74.4 | |
| $C_5^+$ Gasoline, Vol. % | 63.1 | 64.5 | +1.4 |
| Total $C_4$, Vol. % | 17.0 | 17.6 | +0.6 |
| Dry Gas, Wt % | 5.9 | 4.5 | −1.4 |
| Coke, | 3.8 | 3.6 | −0.2 |
| $C_5^+$ Gasoline O.N. (R + O) | 88 | 88.9 | +0.9 |

From the above results, it will be seen that at approximately the same level of conversion, the promoted catalyst of Example 2 gave a 1.4 volume percent $C_5^+$gasoline yield gain and an octane gain of +0.9.

These gains were also achieved with a reduction of dry gas in an amount of 1.4 weight percent and a reduction of coke by 0.2 weight percent.

The following examples will serve to illustrate an embodiment of the invention in which the zeolite additive promoter is contacted directly with the catalytic cracking charge stock by dispersion of the powdered shape selective zeolite therein. Initially, a slurry of zeolite additive promoter in the gas oil charge was prepared. This slurry was conducted to a feed vessel, from which it was gradually displaced by fresh charge stock free of dispersed promoter. The slurry was then conducted through a preheater, where it was preheated to about 900° F. prior to entering the cracking unit for contact with the catalyst.

EXAMPLES 5-9

The catalytic cracking charge stock used in these examples was a hydrotreated Arab Light Atmospheric Resid having the following properties:

| Chargestock Properties | |
|---|---|
| Properties | |
| Ni, ppm | 0.8 |
| V, ppm | 0.6 |
| Gravity, °API | 22.2 |
| Sulfur, % Wt | 0.38 |
| Nitrogen, PPM | 0.08 |
| Basic Nitrogen, % Wt | 311 |
| CCR, % Wt | 3.46 |
| Aniline Point, °F. | 205.1 |
| KV - 210° F., cs | 13.04 |
| Bromine No. | 1.6 |
| Hydrogen, % Wt. | 12.50 |
| Refractive Index - 70° C. | 1.49101 |
| Molecular Wt | 453 |
| Distillation, °F. (D-1160) | |
| IBP | 620 |
| 5% Vol | 686 |
| 10 Vol | 716 |
| 20 Vol | 754 |
| 30 Vol | 792 |
| 40 Vol | 829 |
| 50 Vol | 869 |
| 60 Vol | 922 |
| 70 Vol | 980 |
| Composition, % Wt | |
| Paraffins, % Wt | 23.9 |
| Naphthenes, % Wt | 26.1 |
| Aromatics, % Wt | 50.0 |
| $C_4$, (ndm) | 17.4 |

Cracking was carried out in a fixed fluidized bed bench unit at a temperature of 960° F., utilizing a weight hourly space velocity of about 16 and a catalyst/oil ratio of 1.5.

In the comparative data, hereinafter presented in Table II, Example 5 shows evaluation of the base catalyst, i.e. the steamed FS30 catalyst of Example 1. Example 6 shows results obtained with 0.25 weight percent (on catalyst basis) of HZSM-5 of 0.02-0.05 micron crystallite size and a $SiO_2/Al_2O_3$ mole ratio of 64. Example 7 shows the second cycle evaluation of Example 6 with no additional zeolite additive promoter. Example 8 shows the results obtained with added 0.25 weight percent HZSM-5, having a $SiO_2/Al_2O_3$ mole ratio of about 1500/1. Example 9 shows evaluation with the addition of 0.25 weight percent of ZSM-5 containing only 15 ppm of $Al_2O_3$, i.e. essentially a silica form of ZSM-5. Comparative results obtained are shown in the following table.

TABLE II

| | Example | | | | |
|---|---|---|---|---|---|
| | 5 | 6 | 7 | 8 | 9 |
| | | Added in the HDTALR | | | |
| | Base Steamed Filtrol FS30 | 0.25 wt % HZSM-5 Added In Feed | 2nd Cycle No Additive | 0.25 wt % HZSM-5 1500/1 $SiO_2/Al_2O_3$ | 0.25 wt % ZSM-5 15 ppm $Al_2O_3$ |
| Conversion, Vo. % | 70.8 | 75.7 | 74.9 | 75.1 | 73.7 |
| (1) $C_5$ Gasoline, Vol % (−2.6) | 66.5 | 59.8 (−6.7) | 64.8 (−1.7) | 66.1 (−0.4) | 63.9 |
| Total $C_4$'s, Vo. % | 16.9 | 21.8 (+4.9) | 14.7 (−2.2) | 15.6 (−1.3) | 16.0 (−0.9) |
| Dry Gas, Wt. % | 3.9 | 6.0 (+2.1) | 5.1 (+1.2) | 4.4 (+0.5) | 4.4 (+0.5) |
| Coke, Wt. % | 5.2 | 5.4 (+0.2) | 5.4 (+0.2) | 5.1 (−1.0) | 5.2 0 |
| $C_5^+$ Gasoline O.N. (R + O) | 85.4 | 90.2 (+4.8) | 87 (+1.6) | 86.4 (+1.0) | 86.7 (+1.3) |
| $C_5^+$/O.N. | | −1.4 | −1.0 | −0.4 | −2 |

Note:
Parethetical values are Δ values referred to the values of Example 5

From the above results, it will be seen that an octane number gain as high as +4.8 can be achieved.

EXAMPLES 10-13

The catalytic cracking charge stock used in these examples was Joliet Sour Heavy Gas Oil having the properties set forth in Example 3. Cracking was conducted in a fixed-fluidized bed bench unit at a temperature of 960° F., utilizing a weight hourly space velocity in the range of 11-12 and a catalyst/oil ratio of 2.

In the comparative data hereinafter presented in Table III, Example 10 shows evaluation of the base catalyst, i.e. the steamed Filtrol FS 30 catalyst of Example 1. Examples 11 and 12 show the results obtained with the same base catalyst with the addition of 0.25 weight percent and 0.125 weight percent respectively (on catalyst basis) of HZSM-5 of 0.02-0.05 micron crystallite size and a $SiO_2/Al_2O_3$ mole ratio of about 64 dispersed in the gas oil feed. Example 13 shows evaluation of 0.25 weight percent of HZSM-5 having a $SiO_2/Al_2O_3$ mole ratio of about 1500/1. The comparative results obtained are shown in the following table:

TABLE III

| | Example | | | |
|---|---|---|---|---|
| | 10 | 11 | 12 | 13 |
| | | Added the JSHGO | | |
| | Base Steamed Filtrol FS30 | 0.25 Wt % HZSM-5 | 0.125 Wt % HZSM-5 | 0.25 wt % HZSM-5 1500/1 $SiO_2/Al_2O_3$ |
| Conversion, Vol % | 75.2 | 73.7 | 74.5 | 74.9 |
| $C_5^+$ Gasoline, Vol % | 59.9 | 54.9 (−5) | 57.7 (−2.2) | 58.1 (−1.8) |

TABLE III-continued

| | Example | | | |
|---|---|---|---|---|
| | 10 | 11 | 12 | 13 |
| | | Added the JSHGO | | |
| | Base Steamed Filtrol FS30 | 0.25 Wt % HZSM-5 | 0.125 Wt % HZSM-5 | 0.25 wt % HZSM-5 1500/1 $SiO_2/Al_2O_3$ |
| Total $C_4$'s, Vol % | 19.7 | 18.8 (−0.9) | 17.3 (−2.4) | 20.2 (+0.5) |
| Dry Gas, Wt % | 6.3 | 8.7 (+2.5) | 8.4 (+1.9) | 6.7 (+0.4) |
| Coke, Wt % | 4.3 | 4.4 (−0.1) | 4.5 (+0.2) | 4.3 (+0.4) |
| $C_5^+$ Gasoline, O.N. (R + O) | 89.1 | 90.6 (+1.5) | 90.6 (+1.5) | 90.8 (+1.7) |

Note:
Parenthetical values are Δ values referred to the values of Example 10.

From the above results, it will be evident that utilizing the described slurry additive technique, octane number gains are possible through the addition of an aluminosilicate zeolite of widely varying silica/alumina mole ratio.

It is to be understood that the foregoing description is merely illustrative of preferred embodiments of the invention of which many variations may be made by those skilled in the art within the scope of the following claims without departing from the spirit thereof.

We claim:

1. A process for catalytically cracking a hydrocarbonaceous feedstock comprising the step of contacting the feedstock in a reaction zone under catalytic cracking conditions in the absence of added hydrogen with a catalyst composition comprising a large pore size crystalline aluminosilicate and a matrix and a zeolite component, said zeolite characterized by a particle size less than 5 microns, a mole ratio of oxides of $SiO_2:Al_2O_3$ greater than about 500 and a Constraint Index of about 1 to 12, said zeolite not being intimately combined with a substantial amount of other solid prior to contact thereof with said catalyst composition, wherein the weight ratio of said zeolite to said large pore size crystalline aluminosilicate and matrix is in the range between about 1 to 10,000 and about 1 to 100.

2. The process of claim 1 wherein said zeolite component has a sodium content of less than about 1 weight percent.

3. The process of claim 1 wherein the mole ratio of oxides $SiO_2:Al_2O_3$ is about 1500.

4. The process of claim 1 wherein said zeolite has the characteristic powder x-ray diffraction lines as shown in Table 1.

5. The process of claim 1 wherein said large pore size crystalline aluminosilicate cracking component is a Y type zeolite.

6. The process of claim 1 wherein said large pore size crystalline aluminosilicate cracking component is an REY zeolite.

7. The process of claim 1 wherein the catalytic cracking conditions include a temperature of from about 400° F. to 1300° F., a pressure of subatmospheric to superatomospheric, a catalyst-hydrocarbon weight ratio of about 2 and a weight hourly space velocity of about 12.5 to 16.

8. The process of claim 1 wherein the contacting step comprises contacting a single feed in a single stage in the reaction zone.

9. The process of claim 1 wherein the catalyst composition comprises a physical mixture of the two components.

10. The process of claim 1 wherein said large pore size crystalline aluminosilicate cracking component is incorporated in an inorganic matrix.

11. The process of claim 1 wherein the weight of said large pore size crystalline aluminosilicate cracking component in the inorganic matrix is from 5 to 50 weight percent.

12. The process of claim 1 wherein the weight ratio of said zeolite to the total weight of large pore size crystalline aluminosilicate is from about 1:10,000 to about 1:5.

13. A process for catalytically cracking a hydrocarbonaceous feedstock in a single stage comprising the steps of contacting the feedstock in a reaction zone in the absence of added hydrogen under catalytic riser cracking conditions with a catalyst composition comprising a zeolite component characterized by a mole ratio of oxides $SiO_2:Al_2O_3$ greater than about 500 and a Constraint Index of about 1 to 12 and a particle size of less than about 5 microns and a large pore size crystalline aluminosilicate cracking component and a matrix wherein said zeolite component is not intimately combined with said large pore size cracking component and wherein the weight ratio of said zeolite component to said large pores size cracking component and matrix is in the range between 1 to 10,000 and about 1 to 100 and wherein the concentration of said zeolite component is between about 0.01 and about 1.0 weight percent based on the total quantity of cracking catalyst.

14. The process of claim 13 wherein a single feedstock is contacted in the contacting stage.

15. The process of claim 13 wherein said zeolite has a sodium content of less than about 0.5 weight percent.

16. The process of claim 13 wherein said zeolite has a mole ratio of oxides $SiO_2:Al_2O_3$ of about 1500.

17. In a process for catalytically cracking a hydrocarbonaceous feedstock comprising the step of contacting said feedstock with a conventional FCC catalyst in a reaction zone under riser cracking conditions in the absence of added hydrogen, the improvement comprising adding to said conventional catalyst 0.25 weight percent ZSM-5 having a $SiO_2:Al_2O_3$ mole ratio of 1500/1, and wherein said ZSM-5 is in the ammonia form, is essentially free of chloride ion, is not combined with other solids and has been ground to a particle size less than 5 microns and is added as a separate powder to said conventional FCC catalyst.

18. The process of claim 17 wherein said conventional FCC catalyst comprises about 16 to 17 weight percent RENaY in a matrix.

19. In a process for catalytically cracking a hydrocarbonaceous feedstock comprising the step of contacting said feedstock with a conventional FCC catalyst in a riser cracking reaction zone in the absence of added hydrogen, the improvement comprising adding to said conventional FCC catalyst 0.25 weight percent ZSM-5 catalyst not combined with other solid and containing about 15 PPM $Al_2O_3$ and wherein said ZSM-5 is in the ammonia form, is essentially free of chloride ion, and has been ground to a particle size less than 5 microns and is added as a separate powder to said conventional FCC catalyst.

20. The process of claim 19 wherein said conventional FCC catalyst comprises about 16 to 17 weight percent RENaY in a matrix.

* * * * *